US012560180B2

(12) United States Patent
Almilad

(10) Patent No.: US 12,560,180 B2
(45) Date of Patent: Feb. 24, 2026

(54) VOLUMETRIC PRESSURE REDUCING APPARATUS

(71) Applicant: SAUDI ARABIAN OIL COMPANY, Dhahran (SA)

(72) Inventor: Rashad I. Almilad, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 160 days.

(21) Appl. No.: 18/447,945

(22) Filed: Aug. 10, 2023

(65) Prior Publication Data

US 2025/0052259 A1 Feb. 13, 2025

(51) Int. Cl.
*F15B 1/02* (2006.01)
*F15B 1/04* (2006.01)

(52) U.S. Cl.
CPC ................ *F15B 1/021* (2013.01); *F15B 1/04* (2013.01)

(58) Field of Classification Search
CPC ..... F15B 1/021; F15B 1/04; G01N 2001/105; G01N 2001/1062; G01N 2001/2267; E21B 49/08–10
USPC .......................................................... 141/130
See application file for complete search history.

(56) References Cited

U.S. PATENT DOCUMENTS 3,577,782 A * 5/1971 Aitken .................... E21B 49/10 73/152.53
3,611,799 A * 10/1971 Davis ...................... E21B 49/10 73/152.55
3,673,864 A * 7/1972 Cubberly, Jr. .......... E21B 47/06 73/19.09
3,681,997 A * 8/1972 Allen ................... G01N 1/2035 73/863.61
3,949,612 A * 4/1976 Thompson ............... G02B 3/08 73/864.35
4,213,342 A * 7/1980 Gates ....................... G01N 1/14 73/863.81
4,370,886 A * 2/1983 Smith, Jr. ............... E21B 47/07 73/152.52
4,800,763 A * 1/1989 Hakkers ................... G01N 1/22 73/863.81
5,137,086 A * 8/1992 Stokley ................. E21B 49/082 166/321
6,347,666 B1 * 2/2002 Langseth .............. E21B 49/081 166/252.1
6,435,279 B1 * 8/2002 Howe ................... E21B 49/086 166/336

(Continued)

FOREIGN PATENT DOCUMENTS

EP 1099473 A1 * 5/2001 ............ B01J 8/0035

*Primary Examiner* — Kenneth Rinehart
*Assistant Examiner* — Stephanie A Shrieves
(74) *Attorney, Agent, or Firm* — Vorys, Sater, Seymour and Pease LLP

(57) ABSTRACT

A pressure-reducing sampling apparatus includes a primary pressure chamber for receiving a pressurized fluid from a pressurized component and including a liquid outlet for collecting a sample of a liquid from the pressurized fluid in the primary pressure chamber, one or more secondary pressure chambers in fluid communication with the primary pressure chamber to receive and store a gas received from the primary pressure chamber, and a vent in fluid communication with a final secondary pressure chamber of the one or more secondary pressure chambers and configured to vent the gas from the final secondary pressure chamber.

19 Claims, 3 Drawing Sheets

(56) References Cited

U.S. PATENT DOCUMENTS

| | | | | |
|---|---|---|---|---|
| 6,467,544 | B1 * | 10/2002 | Brown | E21B 49/082<br>166/264 |
| 10,954,783 | B2 * | 3/2021 | Gosney | E21B 21/067 |
| 12,253,440 | B2 * | 3/2025 | Soliman | G01N 1/10 |
| 2006/0196254 | A1 * | 9/2006 | Fjerdingstad | G01N 15/0227<br>250/576 |
| 2010/0095758 | A1 * | 4/2010 | Georgi | E21B 49/10<br>73/152.28 |
| 2012/0014406 | A1 * | 1/2012 | Youngblood | G01N 33/2805<br>374/43 |
| 2021/0255067 | A1 * | 8/2021 | Trefiak | G01N 1/2247 |

* cited by examiner

VOLUMETRIC PRESSURE REDUCING APPARATUS

FIELD OF THE DISCLOSURE

The present disclosure relates generally to fluid sample collection in pressurized systems and, more particularly, to pressure reducing devices and methods for safe sample collection.

BACKGROUND OF THE DISCLOSURE

Pressurized systems, such as oil well flowlines, hydraulic networks, and chemical processing plants, may require constant monitoring and frequent testing to ensure proper operation and fluid health. The fluids within these pressurized systems may include hydraulic fluids, hydrocarbons, or chemical compositions. Accordingly, the health of these fluids may be important for continued operation, for a further process, or as an end product. In some systems, online analyzers may be installed for internal, active monitoring and testing. However, the cost, fragility, and maintenance requirements of online analyzers may be prohibitive in some systems. As such, many systems utilize sample collection methods for retrieving and subsequently testing discrete samples of the pressurized fluids.

The collection of sample fluids from pressurized systems may be difficult or dangerous due to high pressures and hazardous fluid compositions. During sample collection, the pressurized fluid may leak or spill, gas may be rapidly discharged, and unsafe work conditions may be generated. Pressurized systems may utilize pressure-limiting valves for sample collection or specially-designed tubing for extraction from a port. However, the failure of a valve or tubing under high-pressure conditions may further endanger an operator, and spills or gas discharge may still occur.

Accordingly, devices and methods for reducing pressure prior to sample collection for increased safety are desirable.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a pressure-reducing sampling apparatus includes a primary pressure chamber for receiving a pressurized fluid from a pressurized component and including a liquid outlet for collecting a liquid sample from the pressurized fluid in the primary pressure chamber, one or more secondary pressure chambers in fluid communication with the primary pressure chamber to receive and store a gas received from the primary pressure chamber, and a vent in fluid communication with a final secondary pressure chamber of the one or more secondary pressure chambers and configured to vent the gas from the final secondary pressure chamber.

In another embodiment, a method includes receiving a pressurized fluid from a pressurized system into a primary pressure chamber of a pressure-reducing sampling apparatus, testing a pressure of the primary pressure chamber via a pressure gauge, determining if the pressure of the primary pressure chamber exceeds a pre-determined threshold, discharging a gas derived from the pressurized fluid into a secondary pressure chamber in fluid communication with the primary pressure chamber when the pressure of the primary pressure chamber exceeds the pre-determined threshold, and collecting a sample of liquid from the pressurized fluid in the primary pressure chamber when the pressure of the primary pressure chamber is measured below the pre-determined threshold.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
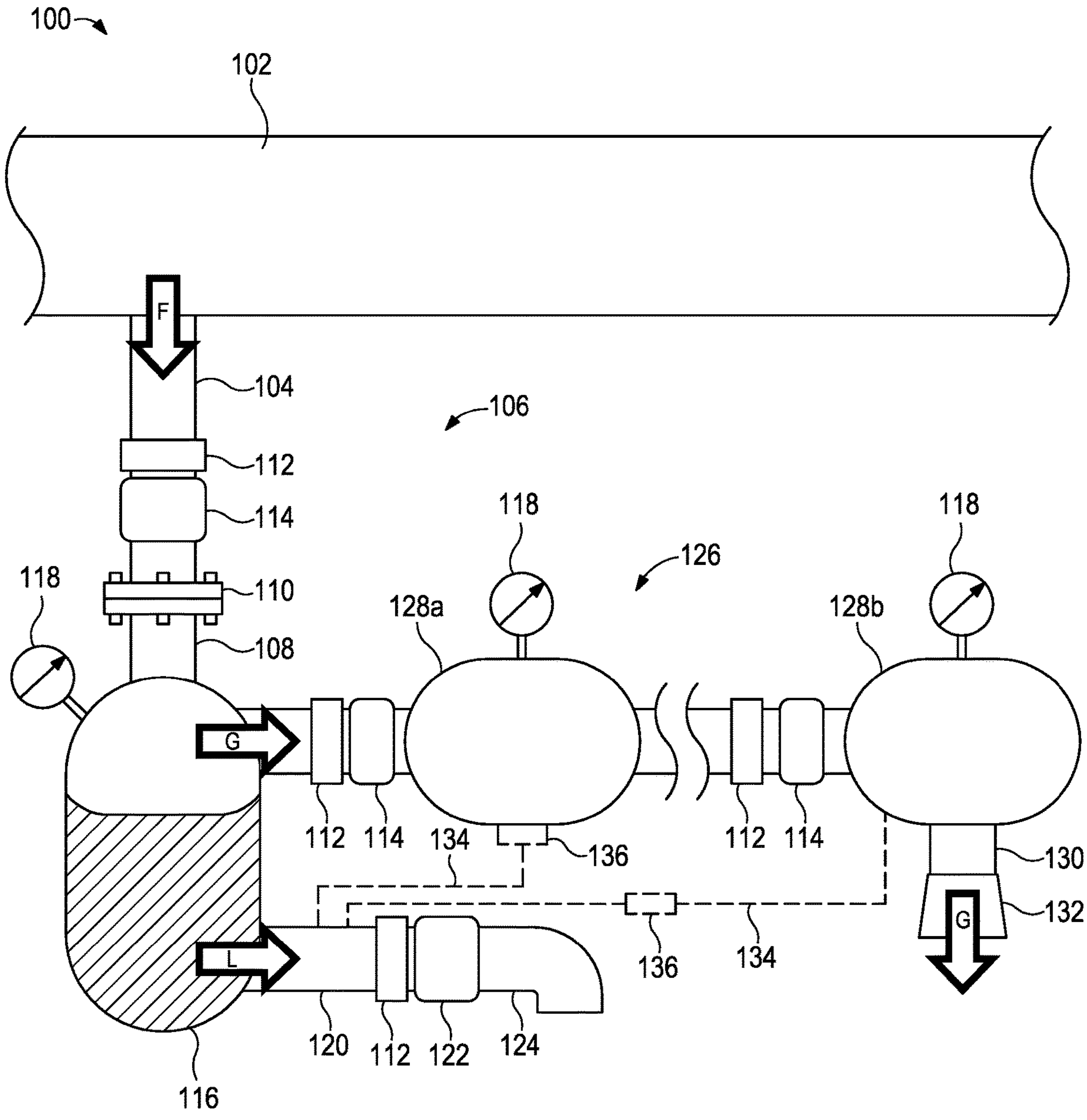
FIG. 1 is a schematic diagram of an example system that may incorporate one or more embodiments of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to fluid sample collection in pressurized systems and, more particularly, to pressure reducing devices and methods for safe fluid sample collection. The principles of the present disclosure may enable collection of fluid samples from a pressurized system with increased safety and reliability. The pressure-reducing apparatus and method described herein may enable pressurized fluid to be extracted from a system and subsequently depressurized prior to sample collection from the apparatus. Relying on Boyle's law and incorporating one or more secondary pressure chambers, the fluid pressure of a primary pressure chamber may be continuously reduced until safe pressure levels are reached (achieved) for sample collection. The embodiments disclosed herein may further enable venting of excess gas during the pressure-reduction process, and may enable manual control of pressures between the plurality of pressure chambers provided within the apparatus. Accordingly, sample collection from pressurized systems may be performed with certainty of safety and reliability while reducing dangerous conditions and spillage of potentially hazardous fluids.

FIG. 1 is a schematic diagram of an example system 100 that may incorporate one or more principles of the present disclosure. The system 100 may include a pressurized component 102 that forms part of a larger pressurized system (not shown here). In some embodiments, however, the pressurized component 102 may comprise an entirety of the pressurized system. The pressurized component 102 may be, for example, a pressure vessel configured to store a pressurized fluid, a conduit (flowline, pipe, tubular, etc.) for transferring (conveying) a pressurized fluid between components, or any other accessible pressurized component 102 of an attached pressurized system.

As illustrated, an extraction conduit 104 may be in fluid communication with and extend from the pressurized component 102. The extraction conduit 104 may be configured to enable a transfer of pressurized fluid from the pressurized component 102 to an external component. In some embodiments, for example, the extraction conduit 104 may be fluidly coupled to a pressure-reducing sampling apparatus 106 (hereinafter, "the apparatus 106"), which may be utilized in sample collection and quality control. In some embodiments, the extraction conduit 104 may be fluidly coupled to the apparatus 106 at an input conduit 108 extending from or forming part of the apparatus 106. In such embodiments, a coupling 110 may be utilized for securing the extraction conduit 104 to the input conduit 108. The coupling 110, illustrated as mated pipe flanges, may further enable fluid communication between the pressurized component 102 and the apparatus 106. In other embodiments, the coupling 110 may comprise a permanent connection via a direct feed line, a male-to-female screw-type flange connection, a quick connect flange, or any additional connection means which are rated to handle expected pressure values within the extraction conduit 104.

In at least one embodiment, one or both of a check valve 112 and a flow valve 114 may be installed within the extraction conduit 104. The check valve 112 may be operable to prevent backflow from the apparatus 106 into the pressurized component 102. The check valve 112 may be a spring-loaded valve, a ball valve, a diaphragm valve, a swing or gate valve, a lift or piston valve, or any additional device which may prevent backflow. The type of check valve 112 may be selected based upon the pressures involves in the system 100 and apparatus 106. Conversely, the flow valve 114 may be operable to enable fluid flow from the pressurized component 102 into the apparatus 106, as desired. In at least one embodiment, the flow valve 114 may be a ball valve or other rotational valve that is operable to open an internal flow path. In other embodiments, however, the flow valve 114 may be any valve capable of being transitioned between a closed state and an open state to enable fluid flow, without departing from the scope of this disclosure.

While the illustrated embodiment shows the check valve 112 and flow valve 114 included on the extraction conduit 104, one or both of the check valve 112 and the flow valve 114 may alternatively be arranged within the input conduit 108, without departing from the scope of the disclosure.

The apparatus 106 may further include a primary pressure chamber 116, which is mated to or otherwise in fluid communication with the input conduit 108 such that pressurized fluids F entering the input conduit 108 from the pressurized component 102 are able to flow into the primary pressure chamber 116 for storage and sampling. The primary pressure chamber 116 may be a fluid tank rated to handle the system 100 pressure, and may be filled through operation (manual, automated, etc.) of the flow valve 114.

The primary pressure chamber 116 may include a pressure gauge 118 that monitors the internal pressure of the pressurized fluid F. Further, the primary pressure chamber 116 may include, or may otherwise be fluidly coupled to, an output conduit 120 which may include a check valve 112 and an outlet valve 122 arranged therein. In some embodiments, the pressurized fluid F may include both a gas G and liquid L within the primary pressure chamber 116. Accordingly, The outlet valve 122 may be operable to enable flow of the liquid L through the output conduit 120 and into a liquid outlet 124. In some embodiments, the outlet valve 122 may be chosen for an ability to control flow values through the liquid outlet 124. In further embodiments, the outlet valve 122 may be the same valve type as one or more of the flow valves 114.

The liquid outlet 124 is illustrated in FIG. 1 as a type of faucet or spigot used to dispense the liquid L into a collection vessel (not shown) for testing or analysis. It should be noted however, that the liquid outlet 124 may alternatively comprise a pressure-reducing valve, coiled tubing, an actuatable nozzle, or any other device for dispensing liquid, without departing from the scope of this disclosure.

The liquid L, when passed into the liquid outlet 124, may traditionally lead to spilling, high-pressure discharge, or gas venting. According to embodiments of the present disclosure, the apparatus 106 may further may include a relief line 126 extending from the primary pressure chamber 116 and configured to help reduce the fluid pressure (e.g., gas pressure) within the primary pressure chamber 116 until a safe pressure level is reached for sample collection via the liquid outlet 124. Accordingly, the relief line 126 may be operable and otherwise used prior to sample collection, in order to reduce pressure in the primary pressure chamber 116.

As illustrated, the relief line 126 may include a check valve 112 and a flow valve 114 arranged therein, such that backflow is prevented within the relief line 126 and the flow of gas G through the relief line 126 may be controlled. The relief line 126 may fluidly connect the primary pressure chamber 116 to one or more secondary pressure chambers, shown as first and second secondary pressure chambers 128*a* and 128*b*. While two secondary pressure chambers 128*a,b* are shown in FIG. 1 arranged in series, more or less than two secondary pressure chambers 128*a,b* may be included in the apparatus 106, without departing from the scope of the disclosure.

In some embodiments, the first secondary pressure chamber 128*a* may be of a similar construction to the primary pressure chamber 116. In alternate embodiments, however, the first secondary pressure chamber 128*a* may be an accumulator, a bladder, or another type of device configured to receive the gas G from the primary pressure chamber 116. The first secondary pressure chamber 128*a* may further include a pressure gauge 118 for monitoring the pressure in the first secondary pressure chamber 128*a* during operation (e.g., the pressure relief process). As the gas G is transferred away from the primary pressure chamber 116 and into the relief line 126, the pressure of the pressurized fluid F in the primary pressure chamber 116 will correspondingly decline. In at least one embodiment, the pressure of the pressurized fluid Fin the primary pressure chamber 116 may be reduced to a point such that safe operation of the liquid outlet 124 may be undertaken.

In some embodiments, as the gas G is transferred from the primary pressure chamber 116 to the first secondary pressure chamber 128*a*, the pressure in the first secondary pressure chamber 128*a* may reach a maximum (or predetermined) value. Once the pressure in the first secondary pressure chamber 128*a* reaches the maximum value, continued flow of the gas G into the first secondary pressure chamber 128*a* may become unsafe, or the check valve 112 on the relief line 126 may be unable to open. In such applications, and in accordance with the embodiment shown in FIG. 1, the relief line 126 may extend from the first secondary pressure chamber 128*a* to the secondary pressure chamber 128*b*. In the extension to the secondary pressure chamber 128*b*, the relief line 126 may include an additional check valve 112 and an additional flow valve 114 arranged therein as a control buffer between the secondary pressure chambers 128*a,b*. During operation, the first secondary pressure chamber 128*a* may pass the gas G on to the further secondary pressure chamber 128*b* to enable further receipt of the gas G in the first secondary pressure chamber 128*a*, and away from the primary pressure chamber 116.

As indicated above, while the illustrated embodiment depicts two secondary pressure chambers 128*a,b*, the relief line 126 may include any number of secondary pressure chambers 128, without departing from the scope of this disclosure. Moreover, each secondary pressure chamber 128 may include corresponding pressure gauges 118 and may be separated by a check valve 112 and a flow valve 114 to prevent backflow and enable flow control.

The final secondary pressure chamber 128, illustrated here as the secondary pressure chamber 128*b*, may include a vent conduit 130. In some embodiments, each secondary pressure chamber 128*a,b* may reach a maximum operating pressure, while the primary pressure chamber 116 remains at a pressure level that is unsafe for sample collection. Accordingly, the vent conduit 130 may fluidly couple the second secondary pressure chamber 128*b* with a vent 132 that is actuatable to release the gas G into the environment or any additional gas storage device (not shown). Accordingly, actuating the vent 132 may lower pressure in the secondary pressure chambers 128*a,b* and enable further transfer of the gas G throughout the relief line 126 until safe sample collection pressures are reaches in the primary pressure chamber 116.

In some embodiments, each secondary pressure chamber 128*a,b* may be in fluid communication with the liquid outlet 124, such that any liquid L overflow into the secondary pressure chambers 128*a,b* may be drained from the apparatus 106. As shown in FIG. 1, for example, one or more drain lines 134 may place the liquid outlet 124 or the output conduit 120 in fluid communication with the secondary pressure chambers 128*a,b*. The drain lines 134 may further include one or more drain line valves 136, which 136 may include check and/or flow valves, similar to check valves 112 and flow valves 114. The drain line valves 136 may be operable to enable draining of liquid L from the secondary pressure chambers 128 while preventing backflow.

Figure 2:
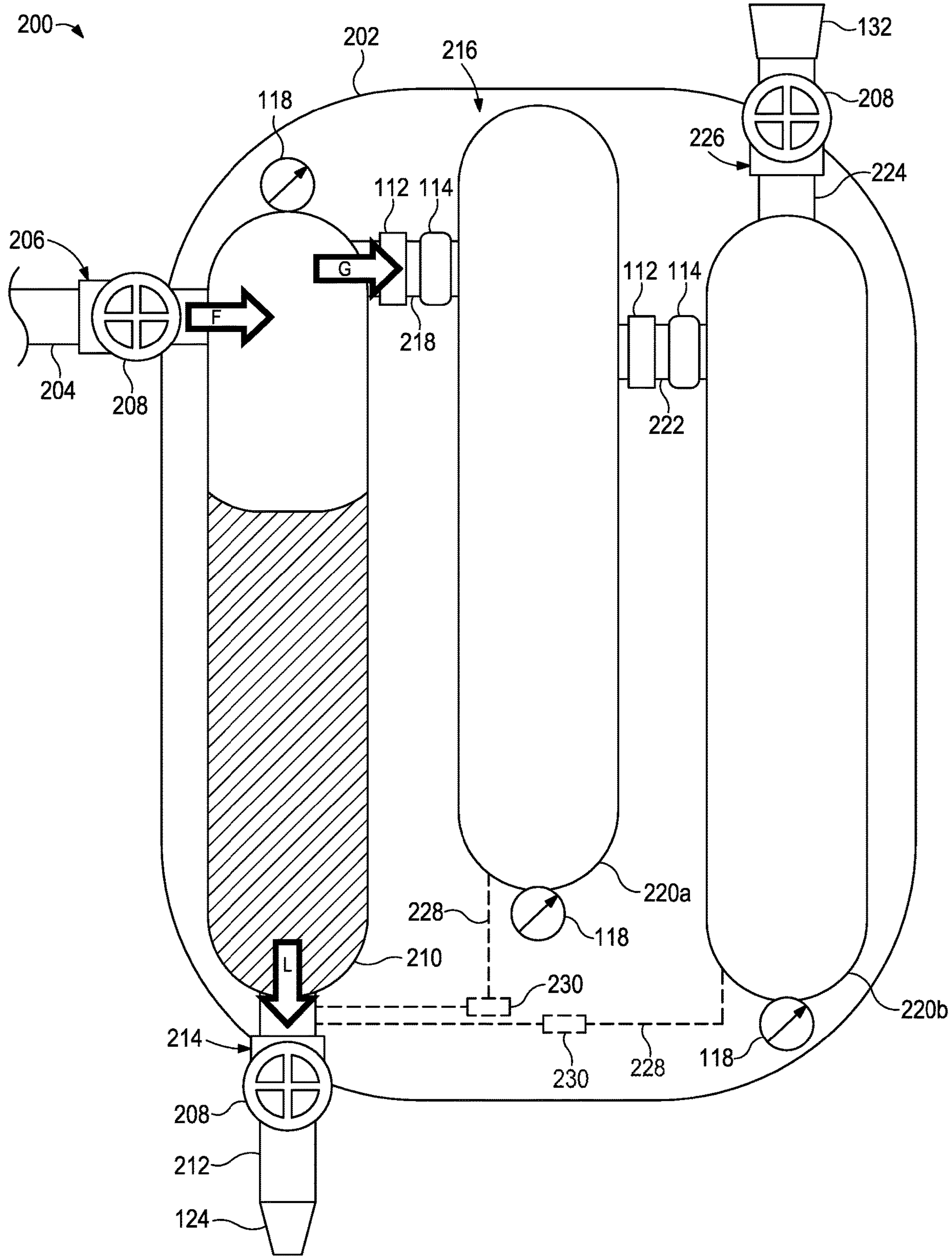
FIG. 2 is a schematic diagram of an example portable pressure reducing apparatus, according to at least one embodiment of the present disclosure.

FIG. 2 is a schematic diagram of an example portable pressure-reducing sampling apparatus 200, according to at least one embodiment of the present disclosure. The portable pressure-reducing sampling apparatus 200 (hereinafter, "the portable apparatus 200") may similar in some respects to the apparatus 106, and therefore may be best understood with reference thereto. The portable apparatus 200 may include a rigid body 202, which encapsulates and otherwise houses one or more components of the portable apparatus 200. The rigid body 202 may be moved or carried to desirable locations for sample collection at will, and removed from the jobsite following its operation. In some embodiments, the rigid body 202 may include one or more handles, grips, mountings, or other means of conveyance (not shown) to help facilitate transportation of the portable apparatus 200.

The portable apparatus 200 may include an input conduit 204, which may be mated to an existing pressurized system or vessel, such as the pressurized component 102 of FIG. 1. The input conduit 204 may include an inlet valve 206 arranged thereon which may facilitate transfer of pressurized fluid F from the attached system (not shown) to the portable apparatus 200. In some embodiments, the inlet valve 206 may include one or more of a check valve and a flow valve, such as the check valve 112 and the flow valve 114 of FIG. 1, such that backflow is prevented and flow controls are provided. In the illustrated embodiment, the inlet valve 206 comprises a handwheel 208 for manual actuation and control of the inlet valve 206. It should be noted, however, that the inlet valve 206 may be controlled via any means of actuation including manual or automatic valve actuation, without departing from the scope of this disclosure.

The input conduit 204 may be in fluid communication with a primary pressure chamber 210 for storage of the pressurized fluid F. Similar to the primary pressure chamber 116 of FIG. 1, the primary pressure chamber 210 may comprise a fluid tank and may be arranged within the rigid body 202. In alternate embodiments, however, the primary pressure chamber 210 may comprise a bladder, an accumulator, or other fluid storage device rated to a specific pressure.

The primary pressure chamber 210 may receive the pressurized fluid F, and an internal pressure of the primary pressure chamber 210 may be monitored using a pressure gauge 118 in fluid communication with the interior of the primary pressure chamber 210. As illustrated, the primary pressure chamber 210 may include an output conduit 212 extending therefrom. The output conduit 212 may include an outlet valve 214 which may include one or both of a check valve and a flow valve. In some embodiments, the outlet valve 214 may include the same configuration of valves as the inlet valve 206. In alternate embodiments, however, the outlet valve 214 may differ in configuration, such that a hydraulic valve or pressure-reducing valve is included therein. As illustrated, the outlet valve 214 may include a handwheel 208 or other actuation means for manual control of the outlet valve 214.

The output conduit 212 may terminate in a liquid outlet 124, such that the liquid L may be extracted from the primary pressure chamber 210 as a sample. In some embodiments, the output conduit 212 may be arranged at or near a bottom of the primary pressure chamber 210 for extraction of the liquid L while limiting the gas received within the output conduit 212.

As with the primary pressure chamber 116 of FIG. 1, the primary pressure chamber 210 may be in fluid communication with a relief line 216. The relief line 216 may include a first relief conduit 218 which enables gas transfer between the primary pressure chamber 210 and a first secondary pressure chamber 220*a*. The first relief conduit 218 may include a check valve 112 and a flow valve 114 arranged therein. As illustrated, the first relief conduit 218 may be placed at or near a top of the primary pressure chamber 210, such that gasses may be transferred from the primary pressure chamber 210 while limiting the transfer of liquid L through the relief line 216. A pressure gauge 118 may communicate with the interior of the first secondary pressure chamber 220*a* for monitoring the internal pressure within the first secondary pressure chamber 220*a*.

In some embodiments, as illustrated, the first secondary pressure chamber 220*a* may be in fluid communication with a second relief conduit 222. The second relief conduit 222 may provide fluid communication between the first secondary pressure chamber 220*a* and a second or "further" secondary pressure chamber 220*b*. As with the first relief conduit 218, a check valve 112 and a flow valve 114 may be installed within the second relief conduit 222 for similar purposes. While not shown in the illustrated embodiment, a handwheel 208 may be similarly provided on the flow valves 114 of the first relief conduit 218 and second relief conduit 222 for external manipulation of the internal flow valves 114.

In the illustrated embodiment, the relief line 216 includes two secondary pressure chambers 220*a,b*. However, those skilled in the art will readily appreciate that the portable apparatus 200 may include any number of secondary pressure chambers 220, without departing from the scope of this disclosure. The further secondary pressure chamber 220*b*, as illustrated, may include a pressure gauge 118. Further, the further secondary pressure chamber 220*b* may be in fluid communication with a vent conduit 224 that connects the further secondary pressure chamber 220*b* with a vent 132 operable to release or transfer gas from the further secondary chamber 220*b*.

The vent conduit 224 may include a vent valve 226, which may be of a similar configuration to one or both of the inlet and outlet valves 206, 214. As above, the vent valve 226 may include a handwheel 208, or other actuation means, for manually operating the vent valve 226. The vent conduit 224 may be positioned at or near the top of the further secondary pressure chamber 220*b*, such that stored or received gas may more easily escape.

In some embodiments, each secondary pressure chamber 220*a,b* may be in fluid communication with liquid outlet 214, such that any liquid L overflow into the secondary pressure chambers 220*a,b* may be drained from the portable apparatus 200. As shown in FIG. 2, one or more drain lines 228 may place the liquid outlet 214 or the output conduit 212 in fluid communication with the secondary pressure chambers 220*a,b*. The drain lines 228 may further include one or more drain line valves 230. The drain line valves 230 may include check and/or flow valves, similar to check valves 112 and flow valves 114, and may be operable to enable draining of liquid L from the secondary pressure chambers 220*a,b* while preventing backflow.

Figure 3:
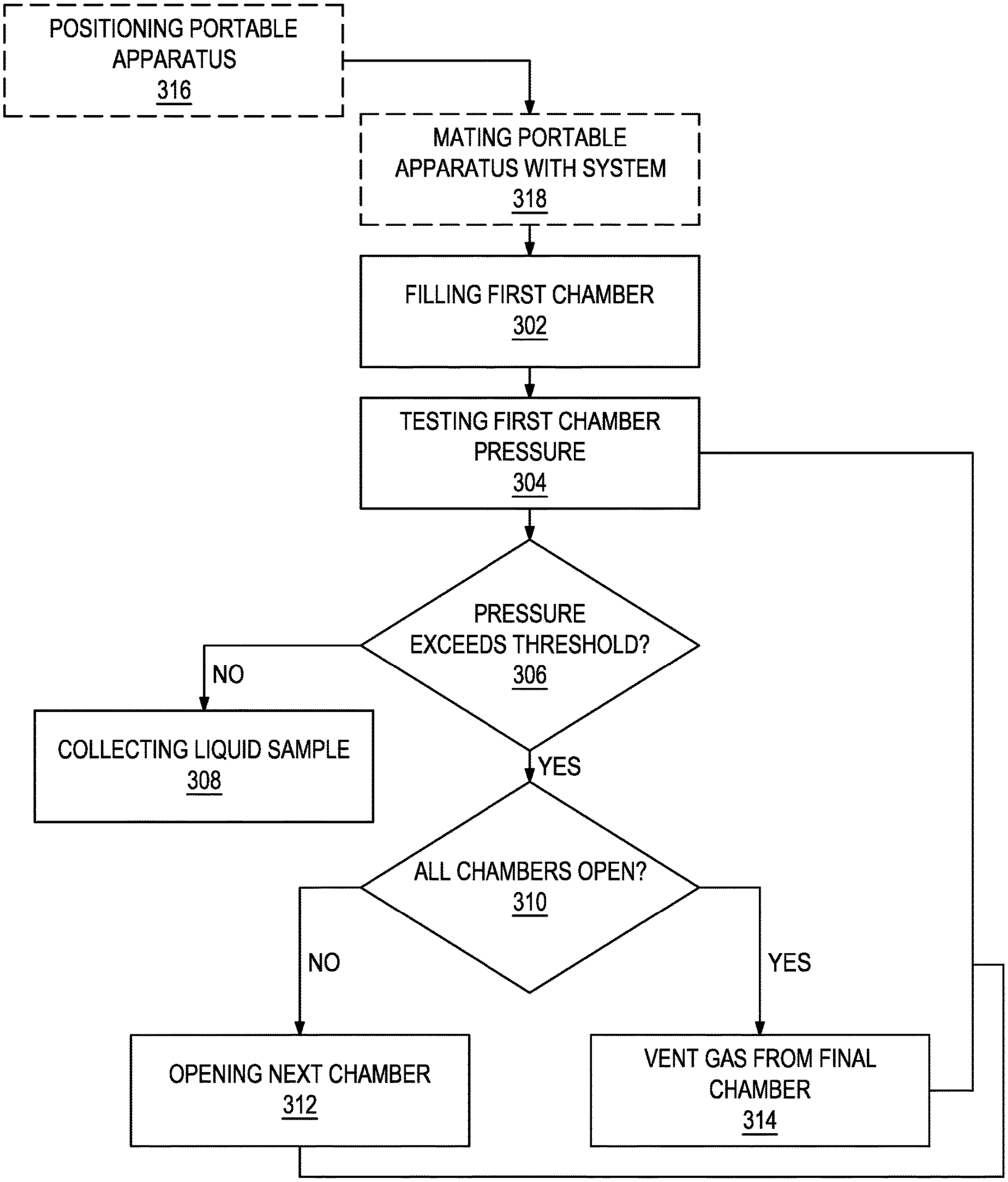
FIG. 3 is a schematic flowchart of an example method for pressure reduction and sample collection, according to at least one embodiment of the present disclosure.

FIG. 3 is a schematic flowchart of an example method 300 for pressure reduction and sample collection, according to at least one embodiment of the present disclosure. The method 300 may begin at 302, in which a first chamber (e.g., the primary pressure chamber 116 of FIG. 1 or primary pressure chamber 210 of FIG. 2) of a pressure-reducing sampling apparatus (e.g., the pressure-reducing sampling apparatus 106 of FIG. 1) receives (e.g., is filled with) a pressurized fluid. The pressurized fluid may be received from a pressurized component (e.g., the pressurized component 102 of FIG. 1) which may form part of a larger pressurized system. At 302, an inlet valve (e.g., the flow valve 114 of FIG. 1) may be actuated to enable pressurized fluid to flow into the first chamber. The pressurized fluid that enters the first chamber may include both a liquid and a gas, or may displace and further pressurize any gas existing within the first chamber.

The method 300 may continue at 304 with testing (monitoring) of a pressure within the first chamber. The first chamber may include, or may be coupled to, a pressure gauge (e.g., the pressure gauge 118 of FIGS. 1 and 2) for monitoring of pressure conditions within the first chamber. Accordingly, at 304, the pressure gauge may be utilized for determining the internal pressure of the first chamber. In some embodiments, the inlet valve may be closed prior to testing of the pressure at 304, such that the pressure may remain constant. The method 300 may continue at 306 with a determination if the pressure exceeds a threshold for safe sample collection. If the fluid in the first chamber is pressurized past the threshold, dangerous conditions may exist when attempting sample collection which may lead to spills, gas venting, or other hazardous events.

If the pressure is determined to be within the threshold at 306, the method may continue at 308 with collection of a liquid sample. The collection of a liquid sample at 308 may be facilitated via an output conduit (e.g., the output conduit 120 of FIG. 1) and a liquid outlet (e.g., the liquid outlet 124 of FIG. 1). Conversely, if the pressure is determined to exceed the threshold within the first chamber, the method 300 may continue at 310. At 310, a determination is made whether or not all secondary chambers (e.g., the secondary pressure chambers 128*a,b* of FIG. 1) of the pressure-reducing apparatus are open and filled.

If it is determined that not all chambers are open and filled at 310, the method 300 may continue at 312 with the opening of the next (fluidly coupled) chamber. The pressure-reducing apparatus may include any number of secondary chambers for relieving pressure and collecting gas from the first chamber. Opening of the next chamber at 312 may enable a further reduction in pressure for each chamber of the pressure-reducing apparatus which may enable safe sample collection.

If it is determined that all chamber are open and filled at 310, the method 300 may continue at 314 with the venting of gas from the final secondary chamber. The final secondary chamber may include a vent conduit (e.g., the vent conduit of 130 FIG. 1) and a vent (e.g., the vent 132 of FIG. 1) such that excess gas may be released from the pressure-reducing apparatus and into the atmosphere or a separate fluid storage device. Venting gas from the final secondary chamber at 314 may enable more gas to enter the final chamber from the preceding chambers, and may subsequently lower the pressure of each chamber in turn.

Regardless of the determination at 310, the method may continue at 304 following either the opening of the next chamber at 312 or venting of gas from the final chamber at 314. At 304, a further testing (monitoring) of the pressure of the first chamber may be performed after the pressure-reduction. The method 300 may then continue at 306 to determine if the newly tested pressure is still above the threshold for safe sample collection, or if further pressure reduction must be undertaken. Accordingly, the method 300 may continue in this cycle of either opening subsequent chambers 310 and/or venting gas from the final chamber at 314 and testing the new pressure at 304 until safe sample collection criteria are met at 306. In this way, the pressure-reducing apparatus and the method 300 may ensure safe sample collection regardless of the initial conditions of the system.

In some embodiments, the pressure-reducing apparatus may be a portable pressure-reducing apparatus (e.g., the portable pressure-reducing apparatus 200 of FIG. 2). In these embodiments, the method 300 may alternatively begin at 316 with positioning of the portable pressure-reducing apparatus at or near the pressurized system. The portable pressure-reducing apparatus may include one or more conveyance methods such as a handle for a crane or pulley, or a mounting bracket for vehicle mounting. In some embodiments, the portable apparatus 200 may be made small and light, such that personnel may carry or move the portable apparatus individually or with little physical effort. In further embodiments, the portable apparatus 200 may be implemented as an equipment case or backpack for transportation by personnel. The portable pressure-reducing apparatus may be brought to the system at 316 during sample collection and subsequently removed to prevent a larger system footprint and increase safety. Accordingly, the method 300 may then continue at 318 with mating of the portable pressure-reducing apparatus with the pressurized system of interest. The portable pressure-reducing apparatus may include an input conduit (e.g., the input conduit 204) which may be coupled to the pressurized system to place the first chamber in fluid communication with the pressurized system. Following mating of the portable pressure-reducing apparatus with the pressurized system at 318, the method 300 may then continue at 302 with filling of the first chamber and may continue therefrom.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including." "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A pressure-reducing sampling apparatus, comprising:

a primary pressure chamber for receiving a pressurized fluid from a pressurized component and including a liquid outlet for directly collecting a liquid sample from the pressurized fluid in the primary pressure chamber, the liquid outlet being arranged at or near a bottom of the primary pressure chamber;

one or more secondary pressure chambers in fluid communication with the primary pressure chamber to receive and store a gas received from the primary pressure chamber; and a vent in fluid communication with a final secondary pressure chamber of the one or more secondary pressure chambers and configured to vent the gas from the final secondary pressure chamber when the final secondary pressure chamber is filled and a pressure of the primary pressure chamber exceeds a predefined threshold.

2. The apparatus of claim 1, further comprising a relief line extending between the primary pressure chamber and a first secondary pressure chamber of the one or more secondary pressure chambers.

3. The apparatus of claim 2, wherein one or more flow valves are installed in the relief line.

4. The apparatus of claim 3, wherein the one or more flow valves are manually operable to transfer gas from the primary pressure chamber to the first secondary pressure chamber.

5. The apparatus of claim 2, further comprising one or more check valves installed in the relief line.

6. The apparatus of claim 1, further comprising:

a first pressure gauge coupled to the primary pressure chamber to measure a pressure within the primary pressure chamber; and a second pressure gauge coupled to at least one of the one or more secondary pressure chambers to measure a pressure within the at least one of the one or more secondary pressure chambers.

7. The apparatus of claim 1, further comprising:

a vent conduit providing fluid communication between the vent and the final secondary pressure chamber; and a flow valve arranged in the vent conduit and manually operable to regulate flow of the gas from the final secondary chamber to the vent.

8. The apparatus of claim 1, further comprising a rigid body that houses the primary pressure chamber and the one or more secondary pressure chambers.

9. The apparatus of claim 1, further comprising:

one or more drain lines placing the one or more secondary chambers in fluid communication with the liquid outlet; and one or more drain line valves interposing the one or more drain lines and operable to drain liquid overflow from the one or more secondary chambers.

10. The apparatus of claim 1, wherein the liquid outlet is selected from the group consisting of a faucet, a pressure-reducing valve, a coiled tubing, and an actuatable nozzle.

11. The apparatus of claim 1, wherein each of the primary pressure chamber and one or more secondary pressure chambers are pressure-rated fluid tanks.

12. The apparatus of claim 1, wherein the one or more secondary pressure chambers are selected from the group consisting of a pressure-rated fluid tank, an accumulator, and a bladder.

13. A method, comprising:

receiving a pressurized fluid from a pressurized system into a primary pressure chamber of a pressure-reducing sampling apparatus;

testing a pressure of the primary pressure chamber via a pressure gauge;

determining if the pressure of the primary pressure chamber exceeds a pre-determined threshold;

discharging a gas derived from the pressurized fluid into a secondary pressure chamber in fluid communication with the primary pressure chamber when the pressure of the primary pressure chamber exceeds the pre-determined threshold; and collecting a sample of liquid from the pressurized fluid in the primary pressure chamber when the pressure of the primary pressure chamber is measured below the pre-determined threshold.

14. The method of claim 13, wherein the secondary pressure chamber comprises a first secondary pressure chamber, the method further comprising:

testing the pressure of the primary pressure chamber after discharging the gas into the secondary pressure chamber;

determining if the pressure of the primary pressure chamber exceeds the pre-determined threshold; and discharging at least a portion of the gas from the first secondary pressure chamber into a second secondary pressure chamber in fluid communication with the first secondary pressure chamber when the pressure of the primary pressure chamber exceeds the pre-determined threshold.

15. The method of claim 14, further comprising:

determining if a final secondary pressure chamber is open and filled with the gas from the primary pressure chamber;

actuating a vent in fluid communication with the final secondary pressure chamber; and venting the gas through the vent and out of the final secondary pressure chamber.

16. The method of claim 13, wherein the primary pressure chamber, the secondary pressure chamber, and the pressure gauge are each housed within a rigid body.

17. The method of claim 16, further comprising manually positioning the rigid body at or near the pressurized system.

18. The method of claim 17, further comprising mating an input conduit of the rigid body to the pressurized system, wherein the input conduit is in fluid communication with the primary pressure chamber.

19. A pressure-reducing sampling apparatus, comprising:

a primary pressure chamber for receiving a pressurized fluid from a pressurized component, the primary pressure chamber including:

a liquid outlet for directly collecting a liquid sample from the pressurized fluid in the primary pressure chamber, and a pressure gauge operable to monitor a pressure within the primary pressure chamber;

a secondary pressure chamber in fluid communication with the primary pressure chamber to receive and store a gas received from the primary pressure chamber; and a vent in fluid communication with the secondary pressure chamber and configured to vent the gas from the secondary pressure chamber when the secondary pressure chamber is filled and the pressure gauge indicates that the pressure within the primary pressure chamber exceeds a predefined threshold.

* * * * *